Patented Sept. 3, 1946

2,407,051

UNITED STATES PATENT OFFICE 2,407,051

STABILIZATION OF RESINS RESULTING FROM POLYMERIZATION OF AN ISOPROPENYL KETONE

David E. Adelson, Berkeley, and Hans Dannenberg, San Francisco, Calif., assignors to Shell Development Company, San Francisco, Calif., a corporation of Delaware No Drawing. Application September 30, 1940,
Serial No. 359,160

14 Claims. (Cl. 260—63)

This invention relates to a method of stabilizing resins resulting from the polymerization of vinyl ketones, isopropenyl ketone and/or acroleins against the deleterious effect of light and air, and to such stabilized resin compositions.

The resins obtained by polymerizing vinyl ketones, isopropenyl ketone and/or acroleins, if properly prepared, are hard, colorless, transparent substances when first polymerized. While these resins may be manufactured from comparatively cheap raw materials and they have attractive properties when first prepared, they have not met with extensive commercial success due in part to their instability to the action of light and air. This has been the case with polymethyl isopropenyl ketone resin, to take a typical member of the class of resins with which the present invention is concerned. This resin has highly suitable properties for a variety of commercial applications in being hard, colorless and transparent. However, in the course of comparatively short periods of time, the action of light and air tends to discolor the resin with yellowish to brown tints and the surface of the resin becomes tacky and soft. Furthermore, if the resin is also exposed to the action of moisture, such as rain or dew, in addition to light and air, the surface acquires a chalky appearance. These changes in the resin are very undesirable and make the resin unsuitable for many applications. The deterioration which occurs appears to be some type of decomposition of the resin since the tacky surface of the resin assumes an odor similar to that of pyruvic acid. Furthermore, solutions obtained by dissolving the discolored and tacky resin in solvents are distinctly acidic while solutions of freshly prepared resin which has not yet deteriorated are substantially neutral.

It is therefore an object of the present invention to provide an economical method of stabilizing resins from vinyl ketones, isopropenyl ketone and/or acroleins which is readily adaptable to large-scale commercial use. Another object is to provide such resins stabilized against the deleterious effects of light and air. A further object is to provide a method of purifying the resins and incorporating the stabilizer with the resin whereby the compositions obtained are particularly suited for molding. These and other objects will be apparent from the description of the invention given hereinafter.

According to our discovery, resins from vinyl ketones, isopropenyl ketone, acroleins or mixtures thereof may be stabilized by incorporating with them a mononuclear aryl hydroxybenzoate. We have also found that the darkening of the resins in molding operations at elevated temperatures and high pressures is largely due to small amounts of color-imparting impurities present in the resin polymer and that by subjecting the resins to a purifying step coupled with incorporation of the stabilizer, valuable, stable molded products may be manufactured. We have discovered moreover that the incorporation of the stabilizer may be combined with the purification to produce in a single operation the resin compositions which are particularly suited for the manufacture of molded articles.

The resins which are stabilized according to the invention are those obtained by polymerizing vinyl ketones, isopropenyl ketones, acroleins or mixtures thereof. By the expression "vinyl ketones" is meant that class of polymerizable ketones which include such compounds as methyl vinyl ketone, ethyl vinyl ketone, divinyl ketone, phenyl vinyl ketone and the like. The expression "isopropenyl ketones" is meant to designate that class of polymerizable ketones including the compounds such as methyl isopropenyl ketone, secondary butyl isopropenyl ketone, diisopropenyl ketone, cresyl isopropenyl ketone, and the like. The essential grouping of atoms in the vinyl and isopropenyl ketones is that of

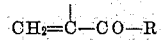

wherein R is a hydrocarbon or substituted hydrocarbon radical. The acroleins are closely related to the vinyl and isopropenyl ketones and include such polymerizable unsaturated aldehydes as acrolein, methacrolein, ethacrolein, alpha-phenylacrolein, alpha-chloracrolein and the like, the acroleins containing the essential grouping

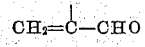

If desired, of course, resins may be stabilized according to the invention which are obtained by polymerizing mixtures of the vinyl ketones, the isopropenyl ketones and/or the acroleins. Thus, resinous polymers of the ketones as well as vinyl ketone-acrolein interpolymers resulting from interpolymerization of a vinyl ketone with an acrolein are rendered stable.

In this application the resinous polymer from methyl isopropenyl ketone is also designated by the term "polymethylene ethyl methyl ketone."

The substances employed as stabilizers for the resins are mononuclear aryl hydroxybenzoates. These compounds are so termed since they are esters derivable from mononuclear phenols and hydroxy benzoic acids. Of these, perhaps phenyl salicylate is the simplest and best known compound. It was found by extensive experimentation that the members of this class of compounds are particularly effective for stabilizing the resins with which the invention is concerned. Perhaps this is in part due to their absorption spectra being in the ultraviolet region. It is essential that the compounds be hydroxybenzoates and that the group linked to the carboxyl group of the hydroxybenzoates be an aryl group which contains a single benzene nucleus. If desired, however, the aryl group may contain one or more substituent groups linked to the benzene nucleus. Typical compounds of the class include, besides phenyl salicylate, such substances as phenyl m-hydroxybenzoate, phenyl p-hydroxy benzoate, o-cresyl salicylate, p-cresyl m-hydroxybenzoate, tolyl salicylate, tolyl m-hydroxybenzoate, isopropyl phenyl salicylate, normal butyl phenyl hydroxybenzoates, tertiary butyl phenyl hydroxybenzoates, tertiary amyl phenyl hydroxybenzoates, allyl phenyl hydroxy benzoates and the like.

The stabilizers may be incorporated with the resins in a variety of manners. In order that the stabilization be most effective, it is desirable that the stabilizer be intimately and uniformly mixed throughout the resin. One of the methods for obtaining this result is to mix the stabilizer with the monomer of the compound to be polymerized and polymerize the resin forming compound in the presence of the stabilizer. The mononuclear aryl hydroxy benzoates are well suited for such an operation since they have little or no effect on the polymerization velocity even though the stabilizers contain a phenolic hydroxyl group and there are numerous teachings in the literature that phenols are polymerization inhibitors.

This fact was demonstrated by an experiment with phenyl salicylate as the stabilizer and methyl isopropenyl ketone as the resin-forming ketone. Methyl isopropenyl ketone polymerizes under the influence of ultra-violet light and the course of the polymerization may be followed by observations of the change of refractive index during polymerization. As methyl isopropenyl ketone polymerizes, the material increases in refractive index and the change is proportional to the degree of polymerization. Three samples of methyl isopropenyl ketone were polymerized at about 50° C. by illumination with light from a Cooper-Hewitt lamp. One of the samples contained 2% phenyl salicylate, another 3% phenyl salicylate and a third contained no stabilizer and was used as a control. At intervals, measurements were made of the refractive indices of the samples. The results of the experiment tabulated below express the change of refractive index as units of the fourth decimal place at 20° C. with the D sodium line for various intervals of time during the course of the polymerization. The results show that mononuclear aryl hydroxy benzoates have no appreciable inhibiting effect on the rate of the polymerization reaction.

| Total hours elapsed | No stabilizer | 2% phenyl salicyalte | 3% phenyl salicylate |
| --- | --- | --- | --- |
| 0 | 0 | 0 | 0 |
| 25 | 115 | 89 | 124 |
| 47 | — | 180 | 224 |
| 72 | — | 278 | — |
| 92 | 312 | 560 | — |
| 115 | (¹) | (¹) | (¹) |

¹ Material was too hard for determination of index of refraction.

Among other methods of incorporating the stabilizer may be mentioned mechanical mixing of the resin with the stabilizer such as grinding the resin to a powder and then grinding in the stabilizer; mechanical milling or compounding the stabilizer into the resin on heated rolls such as are used for rubber compounding; and similar methods. Another method is by soaking the resin in a solution of the stabilizer, which solution is capable of swelling the resin, but does not appreciably dissolve it. Liquids of this character are conveniently prepared from a solvent for the resin with a non-solvent for the resin. For example, with methyl isopropenyl ketone resin a mixture of about 30% acetone and 70% methanol by volume is suitable. The stabilizer may be incorporated in the resin with a solution by soaking at room temperature although the operation is considerably faster if elevated temperatures are employed. After soaking in the solution of the stabilizer, the liquid may be removed from the resin by evaporation; the stabilizers of the invention being substantially non-volatile.

The instability of resins from vinyl ketones, isopropenyl ketones and/or acroleins appears to be due in part to the presence in the resin of monomers and lower polymers and possibly other color-imparting impurities which seem to be somewhat more susceptible to the deleterious action of air than the resinous polymers. The small amounts of monomer and lower polymers are presumably present in the resins because of the fact that as the resin forming compounds polymerize to resinous polymers, the concentration of monomers approaches infinite dilution from formation of the higher resinous polymers. This action tends to steadily decrease the rate of polymerization of the remaining monomer. Even though the resin has been polymerized to a hard, solid substance, the small amounts of monomer continue to polymerize over protracted periods of time as is evidenced by small increases in the refractive index of the resin over such periods. While this behavior would probably permit substantial disappearance of the monomer by aging of the resin, such a procedure is not commercially practicable. Furthermore, the resin may take up iron and other color-imparting impurities during its preparation which tend to discolor the resin in time. By treating the resins to remove the color-imparting impurities including the monomer and lower polymers, the stability of the resins may be improved, especially for use in molding operations. However, such treatment is not in itself sufficient to give a substantially stable resin. It is also necessary that the stabilizer be incorporated with the resin in order to obtain a satisfactory material.

The resins are purified by mixing a non-solvent for the resins with a solution of the resins whereby the resin is precipitated and the monomers and lower polymers and other color-imparting impurities remain in the liquid. Solutions of the crude resins from vinyl ketones, isopropenyl ketones or mixtures of vinyl ketones and acroleins may be prepared using a variety of organic compounds as solvent. For this purpose, for example, there may be employed such substances as the lower aliphatic ketones which are particularly suited like acetone, methyl ethyl ketone, methyl propyl ketone, mesityl oxide, cyclopentanone, cyclohexanone, etc., lower cyclic ethers like dioxane, methyl dioxane, dimethyl dioxane, etc., heterocyclic nitrogen compounds like pyridine, pyrrole, pyrazine, etc., halogenated hydrocarbon like chloroform, chlorobenzene, ethylene dichloride, etc., mixtures thereof and others. Representative classes of substances which are non-solvents and are suitable as precipitants are water, hydrocarbons such as hexane, isooctane, cyclohexane, benzene, toluene, etc., non-cyclic ethers such as ethyl ether, isopropyl ether, butyl ether, etc., alcohols such as methyl alcohol, ethyl alcohol, isopropyl alcohol, ethylene glycol, glycerine, etc., and mixtures thereof.

In purifying the resins, a solution of the resin in any suitable solvent is first prepared. A non-solvent for the resin is then preferably mixed into the solution in any amount sufficient to precipitate the high molecular weight resinous polymers but permitting the monomer and lower polymers and other color-imparting impurities to remain in solution. The precipitate is then filtered from the liquid mixture and any liquid remaining in the resin removed by drying. The purification of the resin improves the stability of the resin towards deterioration by contact with air, but the resin is not in a stabilized condition. To obtain a stable resin it is necessary that a mononuclear aryl hydroxy benzoate be added to the purified resin. This may be accomplished by any of the usual methods such as milling the stabilizer into the resin, grinding the stabilizer with the resin and the like.

Another particularly suitable method is to add the stabilizer to the solution of the resin used in the purification process. When the resin is then precipitated, the stabilizer is incorporated into the precipitated resin by occlusion and the purification of the resin and incorporation of the stabilizer may be reduced to a single operation.

The resins may also be purified with removal of monomers and lower polymers by leaching with a solvent which swells the resin, but does not dissolve the high molecular weight polymers. Solvents for this purpose are conveniently prepared by mixing a substance which is a solvent for the resin with a substance which is a non-solvent. For example, a mixture previously mentioned containing about 30 per cent acetone and 70 per cent methanol by volume is quite satisfactory for methyl isopropenyl ketone resins. The leaching of the resins may be conducted at ordinary temperatures, but the operation is usually more rapid when elevated temperatures are used. After the leaching operation, the resins may be stabilized by incorporating the stabilizer with them.

The amount of stabilizer incorporated with the resins will depend to a large extent upon the particular compound employed as stabilizer, the particular resin to be stabilized and the severity of exposure the resin undergoes in use. It is usually desirable to have at least 0.5% stabilizer present in the resin to obtain appreciable stabilizing effect and preferably from about 2 to 5% is employed.

While transparent and substantially colorless resin compositions have been described the invention is also applicable to stabilization of resins from vinyl ketones, isopropenyl ketone, acroleins or mixtures thereof containing various coloring matter, dyes, fillers, binders and the like.

For illustrative purposes only, the following examples are given to more clearly indicate the nature of the invention, but it is to be understood that the invention claimed is not to be considered limited to the particular details recited in the examples.

EXAMPLE I

Samples of methyl isopropenyl ketone which contained 0, 1, 2 and 3 per cent of phenyl salicylate were polymerized at about 50° C. by illumination from a Cooper-Hewitt lamp. After the samples had polymerized to a hard resin, the stability of the resins was tested by subjecting them to ultraviolet light radiation from a high pressure mercury lamp, in the presence of air. After 5 weeks' exposure which was quite a severe test, the apearance of the resin samples was as tabulated below. The test for chalking was carried out by dropping one drop of distilled water on the sample and letting it dry while exposed to the ultraviolet light. The phenyl salicylate is seen to be very effective in stabilizing the resin.

| Percentage of stabilizer | Color | Tackiness of surface | Chalking of surface |
| --- | --- | --- | --- |
| 0 | Dark yellow | Strong | Slight. |
| 1 | Slightly yellow | Medium | Do. |
| 2 | Very slightly yellow | do | None. |
| 3 | do | Slight | Do. |

EXAMPLE II

Samples of methyl isopropenyl ketone containing 0, 2 and 3 per cent phenyl salicylate were polymerized as described in Example I. The resulting resins were then fastened to a panel and exposed to sunlight out of doors. The panel was mounted at an angle of approximately 30° against the horizontal plane and directed to the south. This test gave an indication of the weathering stability of the resins, as they were exposed to the alternating influence of sunlight and atmospheric moisture (rain, dew). After two weeks of exposure the resins had an appearance as follows:

| Percentage of stabilizer | Color | Tackiness of surface | Chalking of surface |
| --- | --- | --- | --- |
| 0 | Yellow | Slight | Very strong. |
| 2 | Clear | None | Strong. |
| 3 | do | do | Medium. |

EXAMPLE III

Three samples of resin were prepared from methyl isopropenyl ketone which had been polymerized at about 25° C. by light from a high pressure mercury lamp. Sample A was neither purified nor stabilized. Sample B was purified of monomers and lower polymers and other color-imparting impurities by making a four per cent solution in acetone, precipitating the resin from the solution by addition of 2½ times its volume of ethyl alcohol, filtering and drying the precipitate. The precipitated resin was then molded to make Sample B. Sample C was both purified and stabilized. A four per cent solution of crude resin was made up with phenyl salicylate dissolved in it. About 2½ volumes of ethyl alcohol was added to the solution to precipitate the resin. The stabilizer was incorporated in the resin by occlusion during precipitation. After precipitation, the resin was filtered, dried and molded to form the sample. The sample contained about 2.5% phenyl salicylate as stabilizer. The samples were exposed out of doors for two weeks as described in Example II and had the following appearance after that time.

| Sample | Purification | Percentage of stabilizer | Color | Tackiness of surface |
| --- | --- | --- | --- | --- |
| A | None | None | Yellow | Slight. |
| B | Purified | do | do | Do. |
| C | do | 2.5 | Clear | None. |

EXAMPLE IV

The development of tackiness of the surface of unstabilized methyl isopropenyl ketone resin is a manifestation of deterioration caused by light and air. In order to obtain a measure of the softness or tackiness of the surface of stabilized and non-stabilized resin samples, tests were made with a modified Vickers type indentation hardness machine. This machine consists of a pyramidal diamond point and a 5 kilogram weight which is applied to the rod which carries the diamond through a rubber bumper to reduce the shock caused by application of the weight. In making a test of surface hardness, the resin is placed beneath the diamond point and the 5 kilogram load slowly applied. The load is allowed to remain for 15 seconds after full application and the diagonal of the pyramidal indentation formed in the resin is measured under a microscope. The area of the indentation is then calculated from the measurement and it is evident that the larger the area of indentation, the softer is the surface of the resin.

Samples of methyl isopropenyl ketone resin containing various amounts of phenyl salicylate were prepared. The first of these was prepared by taking about 615 cc. of a 3.86% solution of methyl isopropenyl ketone resin in acetone and precipitating the resin by addition to the solution $2\frac{1}{2}$ volumes of ethyl alcohol. The precipitated resin was filtered from the mixture, dried in a high vacuum desiccator and molded. This purified sample contained no stabilizer and was used as a control in the experiments. A second sample of resin was prepared as the first except that 2 gms. of phenyl salicylate were added to the acetone solution so that the stabilizer was occluded by the precipitated resin. The finished resin sample contained about 0.4% phenyl salicylate. A third sample was prepared using 6 gms. of phenyl salicylate which gave a molded sample containing 1.5% stabilizer. A last sample containing 4.6% phenyl salicylate was prepared by addition of 20 gms. to the acetone solution. After preparation, the resin samples were exposed to radiation from an 80 watt high pressure quartz lamp at a distance of 6 inches and measurements were made at intervals of the surface hardness, the results of which are tabulated below. While the accuracy of the method is not entirely satisfactory the general trend of the values indicate the stabilizing effect toward surface tackiness obtained with purification and incorporation of phenyl salicylate.

*Indentation hardness in* $mm.^2$

| Hours of exposure | Percentage of stabilizer | | | |
|---|---|---|---|---|
| | 0 | 0.4 | 1.5 | 4.6 |
| 0 | 0.181 | 0.179 | 0.175 | 0.174 |
| 24 | .218 | .181 | .185 | .197 |
| 88 | .281 | .229 | .220 | .188 |
| 120 | .265 | .222 | .188 | .175 |
| 168 | .255 | .217 | .218 | .175 |
| 216 | .307 | .234 | .217 | .168 |
| 264 | .276 | .223 | .193 | .168 |

EXAMPLE V

A piece of crude methyl isopropenyl ketone resin was leached for 4 days with a mixture containing about 70% methanol and 30% acetone by volume to remove monomer and lower polymers. The swollen resin was then soaked in a 5% solution of phenyl salicylate in a solvent mixture of the same composition for 48 hours. At the end of this time the sample was dried and exposed to light from a quartz lamp for 4 weeks. Following this exposure to light and air, examination of the sample showed that it was not tacky on the surface, had only a very slight odor and was substantially colorless.

EXAMPLE VI

A quantity of methyl vinyl ketone was prepared containing about 2.5% phenyl salicylate and exposed to ultraviolet light until polymerization to a resin occurred. This resin was slightly soft, rubbery, transparent and colorless when first prepared. After exposure to radiation from a quartz lamp for 12 days the resin had no tackiness of the surface, only a slight odor and a slightly yellow color near the surface.

EXAMPLE VII

A mixture containing about 50% methyl isopropenyl ketone and 50% methacrolein was polymerized to the resinous state. The resin was then exposed for three weeks to light from a quartz lamp after which time the resin was yellow and cracked throughout.

A similar mixture was stabilized by addition of about 5% phenyl salicylate. After polymerization and exposure for a like period to light from the quartz lamp, the interior of the resin was free of cracks caused by disintegration and had only a trace of yellow color.

We claim as our invention:

1. A substantially stabilized resin composition containing a stabilizing amount of a mononuclear aryl hydroxy benzoate and a resin resulting from polymerization of methyl isopropenyl ketone.

2. A substantially stabilized resin composition containing a stabilizing amount of phenyl salicylate and a resin resulting from polymerization of an isopropenyl ketone.

3. A substantially stabilized resin composition containing a stabilizing amount of a mononuclear aryl hydroxybenzoate and a resin resulting from polymerization of an isopropenyl ketone.

4. In a process for the stabilization of a resin resulting from polymerization of methyl isopropenyl ketone, the steps which comprise precipitating substantially purified resin from a solution of the crude resin in a lower aliphatic ketone by mixing said solution with a lower aliphatic alcohol, and incorporating at least 0.5 per cent phenyl salicylate with the thus purified resin.

5. In a process for the stabilization of a resin resulting from polymerization of methyl isopropenyl ketone, the steps which comprise precipitating substantially purified resin from a solution of crude resin by mixing said solution with a non-solvent for the resin, and incorporating a stabilizing amount of a mononuclear aryl hydroxybenzoate with the thus purified resin.

6. In a process for the stabilization of resins of isopropenyl ketone polymers, the steps which comprise precipitating substantially purified resin from a solution of crude resin by mixing said solution with a non-solvent for the resin, and incorporating a stabilizing amount of a mononuclear aryl hydroxybenzoate with the thus purified resin.

7. In a process for the stabilization of a resin resulting from polymerization of methyl isopropenyl ketone, the steps of leaching the crude resin with a mixture containing about 30 per cent of a lower aliphatic ketone and about 70 per cent of a lower aliphatic alcohol by volume, and incorporating at least 0.5 per cent of phenyl salicylate with the thus purified resin.

8. In a process for the stabilization of resins of isopropenyl ketone polymers, the steps which comprise leaching the crude resin with a solvent which swells the resin, but does not appreciably dissolve the same, and incorporating a stabilizing amount of a mononuclear aryl hydroxybenzoate with the thus purified resin.

9. A process of improving the stability of polymethylene ethyl methyl ketone which is normally light and weather unstable comprising incorporating therein phenyl salicylate.

10. A composition of matter possessing increased resistance to the influences of light and weather comprising normally light and weather unstable polymethylene ethyl methyl ketone and phenyl salicylate.

11. A process of improving the stability of polymethylene ethyl methyl ketone which is normally light and weather unstable comprising incorporating therein a mononuclear aryl ester of salicylic acid.

12. A process of improving the stability of polymethylene ethyl methyl ketone which is normally light and weather unstable comprising incorporating in monomeric methylene ethyl methyl ketone a mononuclear aryl ester of salicylic acid and then subjecting the mixture to polymerizing conditions.

13. A composition of matter possessing increased resistance to the influences of light and weather comprising normally light and weather unstable polymethylene ethyl methyl ketone and a mononuclear aryl ester of salicylic acid.

14. A composition of matter possessing increased resistance to the influences of light and weather prepared by incorporating in monomeric methylene ethyl methyl ketone normally light and weather unstable in its polymerized form a mononuclear aryl ester of salicylic acid and then subjecting the mixture to polymerizing conditions.

DAVID E. ADELSON.
HANS DANNENBERG.